United States Patent [19]

Miyamoto et al.

[11] Patent Number: 5,542,389

[45] Date of Patent: Aug. 6, 1996

[54] CONTROL SYSTEM FOR MULTI-CYLINDER INTERNAL COMBUSTION ENGINE

[75] Inventors: Katsuhiko Miyamoto; Kazumasa Iida, both of Tokyo, Japan

[73] Assignee: Mitsubishi Jidosha Kogyo Kabushiki Kaisha, Tokyo, Japan

[21] Appl. No.: 244,291

[22] PCT Filed: Sep. 29, 1993

[86] PCT No.: PCT/JP93/01386

§ 371 Date: Jun. 20, 1994

§ 102(e) Date: Jun. 20, 1994

[87] PCT Pub. No.: WO94/08134

PCT Pub. Date: Apr. 14, 1994

[30] Foreign Application Priority Data

Sep. 29, 1992 [JP] Japan ................... 4-259753
Oct. 28, 1992 [JP] Japan ................... 4-290271
Oct. 28, 1992 [JP] Japan ................... 4-290272

[51] Int. Cl.$^6$ ................................. F02M 3/00
[52] U.S. Cl. ....................................... 123/339.1
[58] Field of Search ............................. 123/339, 481, 123/436, 419; 322/27; 364/431.01

[56] References Cited

U.S. PATENT DOCUMENTS

| | | | |
|---|---|---|---|
| 4,550,704 | 11/1985 | Barho et al. | 123/481 |
| 5,035,220 | 7/1991 | Uchinami et al. | 123/436 |
| 5,213,081 | 5/1993 | Fujimoto | 123/419 |
| 5,320,077 | 6/1994 | Kamiya et al. | 123/339 |
| 5,352,971 | 10/1994 | Nishimura | 322/27 |
| 5,365,445 | 11/1994 | Takizawa | 364/431.01 |
| 5,375,574 | 12/1994 | Tomisawa et al. | 123/339 |

FOREIGN PATENT DOCUMENTS

| | | |
|---|---|---|
| 59-206633 | 11/1984 | Japan . |
| 60-43173 | 3/1985 | Japan . |
| 61-132774 | 6/1986 | Japan . |
| 63-1759 | 1/1988 | Japan . |
| 2291475 | 12/1990 | Japan . |
| 2251268 | 7/1992 | United Kingdom ............ 123/339 |

*Primary Examiner*—Raymond A Nelli
*Attorney, Agent, or Firm*—Evenson, McKeown, Edwards & Lenahan

[57] ABSTRACT

A control system is provided for an internal combustion engine which can stop the supply of fuel to some of its cylinders to perform part cylinder operation in a particular state of operation, The control system promptly stabilizes the engine speed after effecting switching between full cylinder operation and part cylinder operation and also stabilizes an idle speed with good responsibility by correcting the ignition timing. The control system calculates basic ignition timing, the difference between a smoothed engine speed and the engine speed, and an ignition timing correction amount corresponding to the difference at least in the course of the idling. The control system further includes an ignition timing correction control system for controlling the manner of operation of the calculation of the ignition timing correction amount upon at least one of the switching between the full cylinder operation and the part cylinder operation, and the part cylinder operation. The control system also calculates a target ignition timing on the basis of the basic ignition timing and the ignition timing correction amount, and drives the ignition drive for the respective cylinders.

8 Claims, 11 Drawing Sheets

CONTROL SYSTEM FOR MULTI-CYLINDER INTERNAL COMBUSTION ENGINE

TECHNICAL FIELD

This invention relates to a multi-cylinder internal combustion engine ("internal combustion engine" may hereinafter be called "engine") adapted to be mounted on an automotive vehicle or the like, and more specifically to a control system developed by paying attention especially to idling of an engine which can stop the supply of air-fuel mixture to some of its cylinders to perform part cylinder operation in a particular state of operation.

BACKGROUND ART

With a view to ensuring stabilization of the engine speed of an automotive engine during idling or the like, there have been proposed techniques in which pieces of engine speed information, which are repeatedly detected, are subjected to smoothing (averaging) processing, the smoothed engine speed so obtained is compared with the latest rotary speed information and the ignition timing is then corrected by data based on the difference therebetween. The ignition timing is advanced when the latest engine speed is lower than the smoothed value but is retarded conversely when the latest engine speed is higher than the smoothed value.

On the other hand, other proposals have also been made on the technique that in an automotive engine, intake and exhaust valves of some of its cylinders are kept closed or injectors for supplying fuel to some of its cylinders are selectively inactivated at the time of specific operation featuring a small required output torque such as under a low load to substantially stop a part of combustion strokes in the engine and hence to achieve an improvement in gas mileage, in other words, on variable displacement engines.

The present inventors are not aware of any case in which the above-described idle stabilization technique based on correction of the ignition timing is applied to the variable displacement engine described above. Even if the conventionally-known idle stabilization technique is applied simply to a variable displacement engine, the following problems arise.

First, upon switching part cylinder operation to full cylinder operation or vice versa at the time of idling, the engine speed generally varies (or the engine speed is deliberately changed to obtain an idle speed suited for part cylinder operation or full cylinder operation). At this switching, especially at the time of such switching that the engine speed varies upwards (or at the time of such switching that the engine speed is changed upwards), the ignition timing is corrected toward la retard side to suppress the increase in the engine speed. As a consequence, it takes time until the engine speed becomes close to a desired value subsequent to the switching, so that engine revolutions become unstable.

Where it is designed to deliberately make the idle speed higher at the time of part cylinder operation than at the time of full cylinder operation from the viewpoint of a countermeasure for vibrations (for example, where the idle speed is set at 850 rpm at the time of the part cylinder operation and at 750 rpm at the time of the full cylinder operation), there is the problem that the countermeasure for the vibrations is unable to show its effect, that is, to attain the primary object sufficiently immediately after the switching.

Further, as is shown in FIG. 11, the degree of a variation in the engine speed relative to a variation in the ignition timing at the time of idling differs between part cylinder operation and full cylinder operation. Described specifically, a variation in the engine speed relative to a variation in the ignition timing is smaller during the part cylinder operation than during the full cylinder operation and especially during the part cylinder operation, variations in the engine speed are leveled off in an advance-side range e1.

If a correction is attempted to stabilize idling during part cylinder operation by using an ignition timing correction gain Kinj set for full cylinder operation (Kinj is $\Delta\theta/\Delta Ne$, where $\Delta\theta$ is an ignition timing correction amount and $\Delta Ne$ is a difference in engine speed), deviations in revolutions cannot be corrected fully because the correction is not adequate, for example, the absolute value of the ignition timing correction amount per unit revolution is small. This results in the problem that variations in the idle speed cannot be corrected with good responsibility by adjusting the ignition timing.

With the foregoing problems in view, the present invention has as an object thereof the provision of a control system for a multi-cylinder internal combustion engine, in which at the time of at least one of switching between full cylinder operation and part cylinder operation and the part cylinder operation, the engine speed subsequent to the switching between the full cylinder operation and the part cylinder operation can be promptly stabilized by controlling the manner of operation for the calculation of an ignition timing correction amount and the idle speed can also be stabilized with good responsibility by correcting the ignition timing.

SUMMARY OF THE INVENTION

To achieve the above object, the present invention provides a control system for a multi-cylinder internal combustion engine in which switching between full cylinder operation with all cylinders in operation and part cylinder operation with some of the cylinders kept out of operation is performed at least in the course of idling, comprising: means for calculating basic ignition timing on the basis of load on and an engine speed of the internal combustion engine; means for calculating the difference between a smoothed engine speed, which has been obtained by smoothing engine speeds of the internal combustion engine, and the engine speed of the internal combustion engine; means for calculating an ignition timing correction amount corresponding to the difference at least in the course of the idling; ignition timing correction control means for controlling the manner of operation of the ignition timing correction amount calculation means upon at least one of the switching between the full cylinder operation and the part cylinder operation and the part cylinder operation; means for calculating a target ignition timing on the basis of the basic ignition timing and the ignition timing correction amount; and means for driving, at the target ignition timing, ignition drive means for the respective cylinders in the internal combustion engine.

In the control system of the present invention for the multi-cylinder internal combustion engine, the ignition timing correction control means can be constructed to operate at the time of the part cylinder operation in a manner different from the manner of operation thereof at the time of the full cylinder operation.

In the control system of the present invention for the multi-cylinder internal combustion engine, the ignition timing correction control means can be constructed to control the manner of operation of the ignition timing correction amount calculation means so that the ignition timing correction amount can be set greater at the time of the part cylinder operation than at the time of the full cylinder operation.

In the control system of the present invention for the multi-cylinder internal combustion engine, the ignition timing correction control means can be constructed to control the manner of operation of the ignition timing correction amount calculation means so that the ignition timing correction amount can be set greater at the time of the part cylinder operation than at the time of the full cylinder operation and at the time of the part cylinder operation, an advance-side ignition timing correction amount can be set greater in absolute value than a retard-side ignition timing correction amount.

In the control system of the present invention for the multi-cylinder internal combustion engine, the ignition timing correction control means can be constructed to make operation of the ignition timing correction amount calculation means substantially ineffective upon switching between the full cylinder operation and the part cylinder operation.

In the control system of the present invention for the multi-cylinder internal combustion engine, an idle speed can be set faster in the full cylinder operation than in the part cylinder operation, and the ignition timing correction control means can be constructed to make the operation of the ignition timing correction amount calculation means substantially ineffective upon switching from the full cylinder operation to the part cylinder operation.

The control system of the present invention for the multi-cylinder internal combustion engine can further comprise means for temporarily increasing the amount of intake air to the internal combustion engine upon switching from the full cylinder operation to the part cylinder operation.

In the control system of the present invention for the multi-cylinder internal combustion engine, the ignition timing correction control means can be constructed so that operation of the ignition timing correction amount calculation means can be made substantially ineffective upon switching between the full cylinder operation and the part cylinder operation and the manner of operation of the ignition timing correction amount calculation means can be controlled to set the ignition timing correction amount greater at the time of the part cylinder operation than at the time of the full cylinder operation.

In the control system of the present invention for the multi-cylinder internal combustion engine, the ignition timing correction control means can be constructed to control the manner of operation of the ignition timing correction amount calculation means so that at the time of the part cylinder operation, the ignition timing correction amount can be set greater in absolute value on an advance side than on a retard side.

According to the ignition control system of the present invention for the multi-cylinder internal combustion engine, a greater ignition timing correction amount per unit difference in idle speed can be set greater in a part cylinder mode than in a full cylinder mode upon correction of a difference in idle speed at the time of idling. This can compensate low responsibility upon correction of a variation in the idle speed due to an insufficient ignition timing correction amount at the time of the part cylinder operation. In particular, the advance-side ignition correction amount can be set greater in absolute value than the retard-side ignition correction amount at the time of the part cylinder operation. When the idle speed has dropped, the idle speed can therefore be increased with good responsibility to avoid an engine failure. In this respect, the idle speed can also be stabilized with good responsibility.

In the ignition control system of the present invention for the multi-cylinder internal combustion engine, upon switching from the full cylinder operation to the part cylinder operation in the course of idling, the switching to the part cylinder operation can be performed by increasing the amount of intake air to raise the engine speed and at the same time, inhibiting the ignition timing correction, which would otherwise be effected to reduce a torque shock due to the increase in the engine speed, to promote the increase in the engine speed. This has made it possible to prevent a sudden drop in the idle speed which would otherwise take place when the operation mode has been switched to the part cylinder operation.

BEST MODE FOR CARRYING OUT THE INVENTION

One embodiment of the present invention will hereinafter be described with reference to the drawings.

Figure 1:
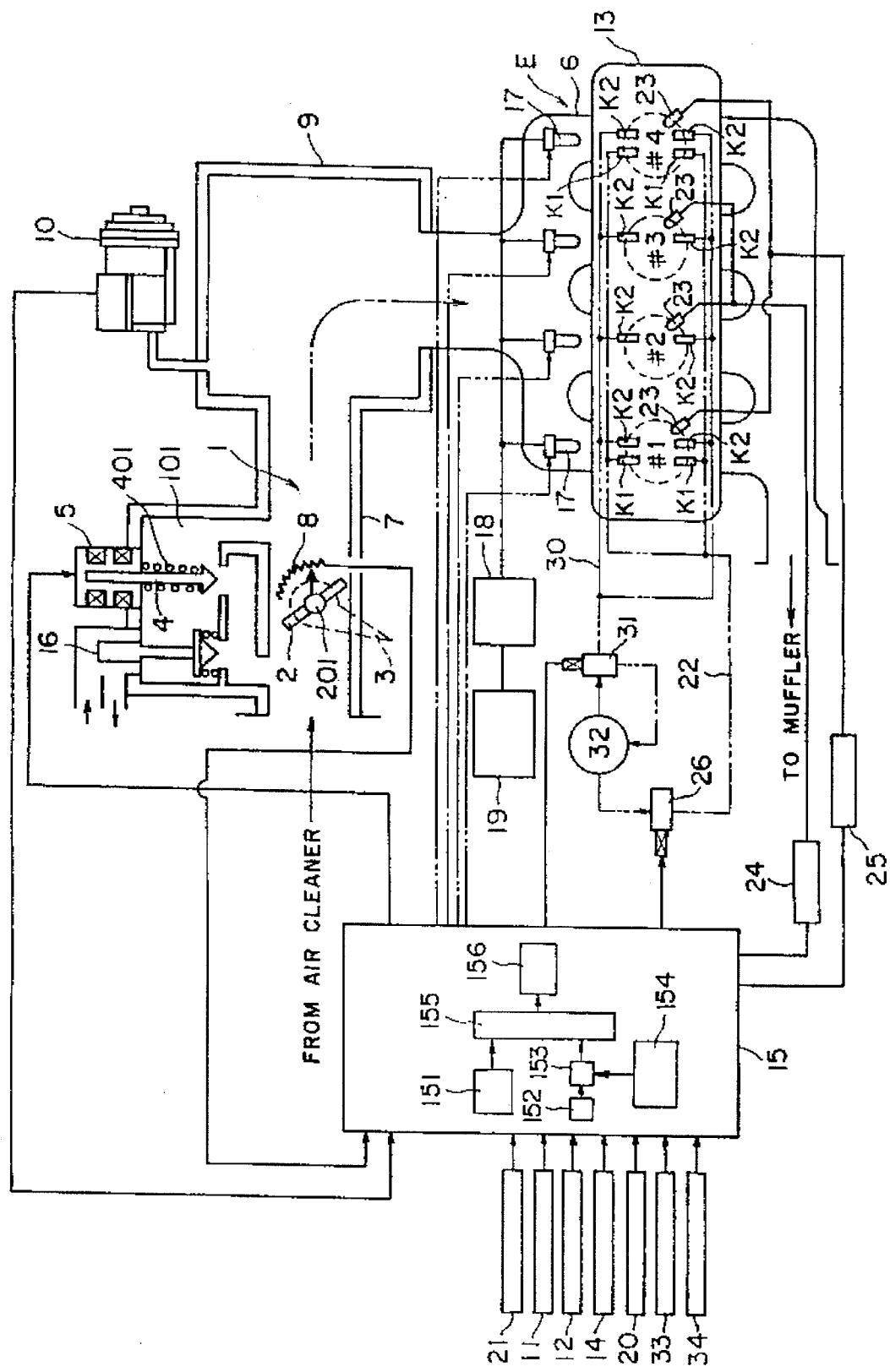
FIG. 1 is an overall construction block diagram of a control system for an internal combustion engine, as one embodiment of the present invention.

The engine control system shown in FIG. 1 is mounted on an in-line 4-cylinder engine equipped with an operation mode switching system (hereinafter referred to merely as the "engine E").

An intake passage 1 of the engine E is formed of an intake branch pipe 6, a surge tank 9 connected to the intake branch pipe, an intake pipe 7 integral with the tank, and an unillustrated air cleaner. Arranged inside the intake pipe 7 is a throttle valve 2 which is pivotally supported. Outside the intake passage 1, a pin 201 of the throttle valve 2 is connected to a throttle lever 3.

The throttle lever 3 is connected to the throttle valve 2 so that in association with an accelerator pedal (not shown), the throttle valve 2 is pivoted counterclockwise in FIG. 1. By a return spring (not shown) which urges the throttle valve 2 in a closing direction, the throttle valve is gradually closed as the tensile force by an accelerator cable is reduced. Incidentally, the throttle valve 2 is provided with a throttle position sensor 8 which outputs information on the position of the valve.

On the other hand, a bypass intake passage 101 which bypasses the throttle valve 2 is provided with an idle speed control (ISC) valve 4 for controlling idling. The valve 4 is biased to remain in a closed position by a spring 401, but is driven by a stepper motor 5. Numeral 16 indicates a fast idle air valve which upon idling, automatically performs warm-up correction according to the temperature of coolant.

Further, the intake passage 1 is also provided with an intake air temperature sensor 14 for outputting information on an intake air temperature Ta. Also provided are a coolant temperature sensor 11 for detecting the temperature of the coolant as a warm-up temperature of the engine, an engine speed sensor 12 for detecting the engine speed on the basis of ignition pulses, a battery sensor 20 for detecting a battery voltage VB, and a knock sensor 21 for outputting knock information. In addition, a negative pressure sensor 10 for outputting information on an intake pipe pressure Pb is mounted on the surge tank 9.

Formed in a cylinder head 13 of the engine E are intake passages and exhaust passages which can be connected to respective cylinders. The individual passages are closed or opened by corresponding intake or exhaust valves which are not shown.

The valve system of FIG. 1 is equipped with a valve stop mechanism, which selectively drives the unillustrated intake and exhaust valves by low-speed cams or high-speed cams (not shown) to achieve operation in a low-speed mode M-1 or a high-speed mode M-2. Moreover, the valve stop mechanism also stops the individual valves of a first cylinder (#1) and a fourth cylinder (#4) as selectively inactivated cylinders other than a second cylinder (#2) and a third cylinder (#3) as normally operative cylinders, thereby permitting operation in a part cylinder mode M-3. The valve stop mechanism for the valve system is constructed by providing each rocker arm (not shown) with a hydraulic low-speed change-over mechanism K1, which can stop operation of the corresponding low-speed cam for the intake and exhaust valves at a predetermined time, and also with a hydraulic high-speed change-over mechanism K2 which can stop operation of the corresponding high-speed cam for the intake and exhaust valves at a predetermined time.

Each change-over mechanism K1 or K2 has such a known construction that engagement and disengagement between the corresponding rocker arm and an associated rocker shaft (both, not illustrated) can be selectively conducted by alternately moving one of coupling pins (not shown) by a hydraulic cylinder.

Each low-speed change-over mechanism K1 is supplied with pressure oil from a hydraulic circuit 22 via a first solenoid valve 26, whereas each high-speed change-over mechanism K2 is supplied with pressure oil from a hydraulic circuit 30 via a second solenoid valve 31. Here, operation in the low-speed mode M-1 by the low-speed cams is achieved when the first and second solenoid valves 26,31, each a three-way valve, are off. Operation in the high-speed mode M-2 by the high-speed cams is attained when the first and second solenoid valves 26,31 are both on. Operation in the part cylinder mode M-3 is attained when the first solenoid valve 26 is on and the second solenoid valve 31 is off. These solenoid valves 26,31 are driven and controlled by an engine control unit (ECU) 15 which will be described subsequently. Incidentally, numeral 32 indicates a pressure oil source.

Further, injectors 17 for injecting fuel into associated cylinders are mounted on the cylinder head 13 in FIG. 1. From a fuel supply source 19 each injector receives fuel whose pressure has been regulated to a predetermined level by fuel pressure regulator means 18.

Figure 2:
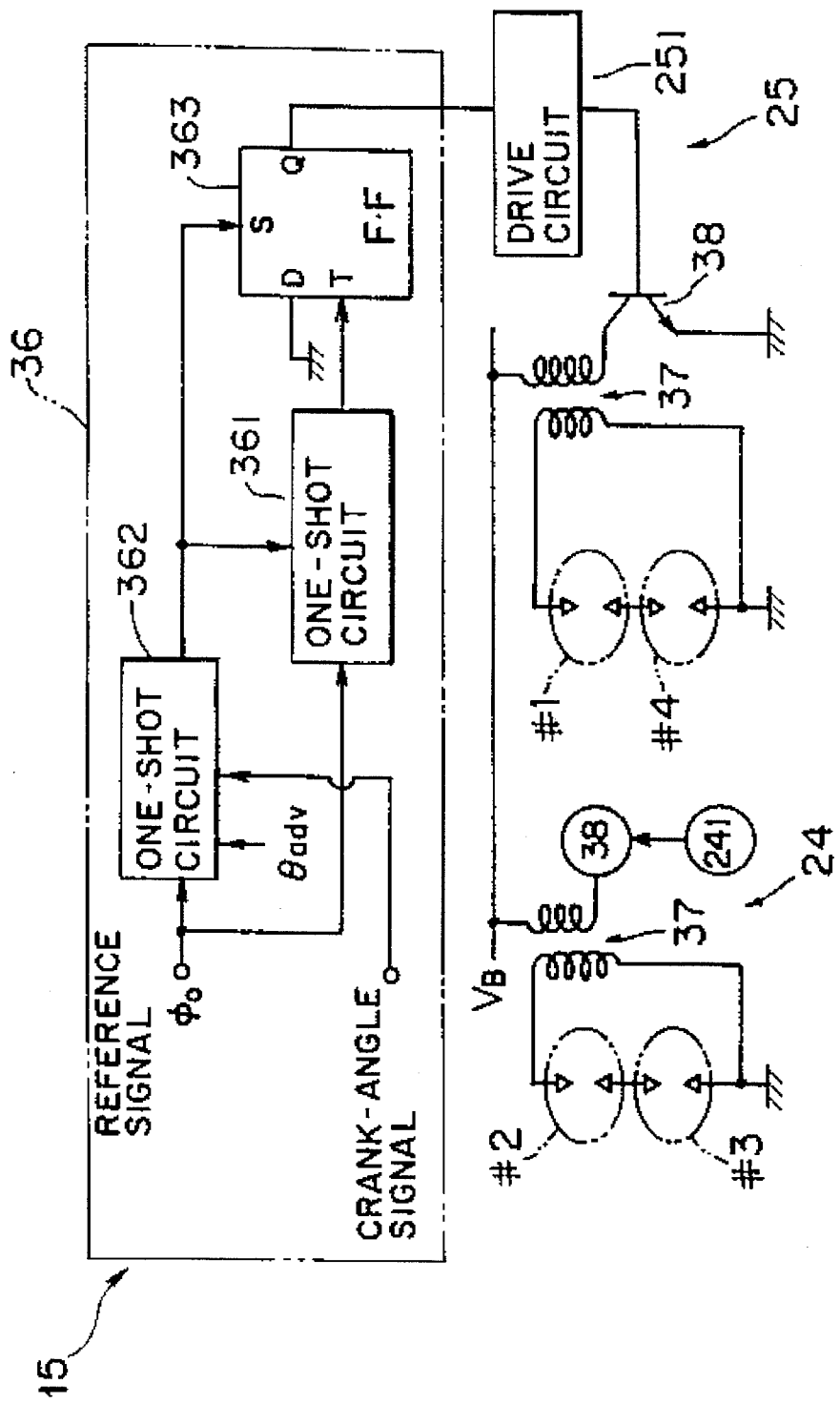
FIG. 2 is a block diagram of an ignition drive circuit in the control system of FIG. 1.

On the cylinder head 13 shown in FIG. 1, spark plugs 23 are mounted for the individual cylinders. Both the spark plugs 23 for the normally operative cylinders #2,#3 are connected together and are then connected to an igniter 24, whereas the spark plug 23 for the selectively inactivated cylinders #1, #4 are connected together and are then connected to an igniter 25. These igniters are arranged in a single ignition drive circuit. The spark plugs 23 and the ignition drive circuit constitute ignition drive means. The ignition drive circuit also includes a pair of timing control circuits 36 (only one of which is illustrated in FIG. 2) in the ECU 15 and a pair of open/close drive circuits 241,251 disposed on sides of the igniters 24,25, respectively. Connected to the respective open/close drive circuits 241,251 are power transistors 38,38 which control their opening/closing timings and energized time periods. Ignition coils 37,37 are connected to the power transistors 38,38, respectively.

Figure 3:
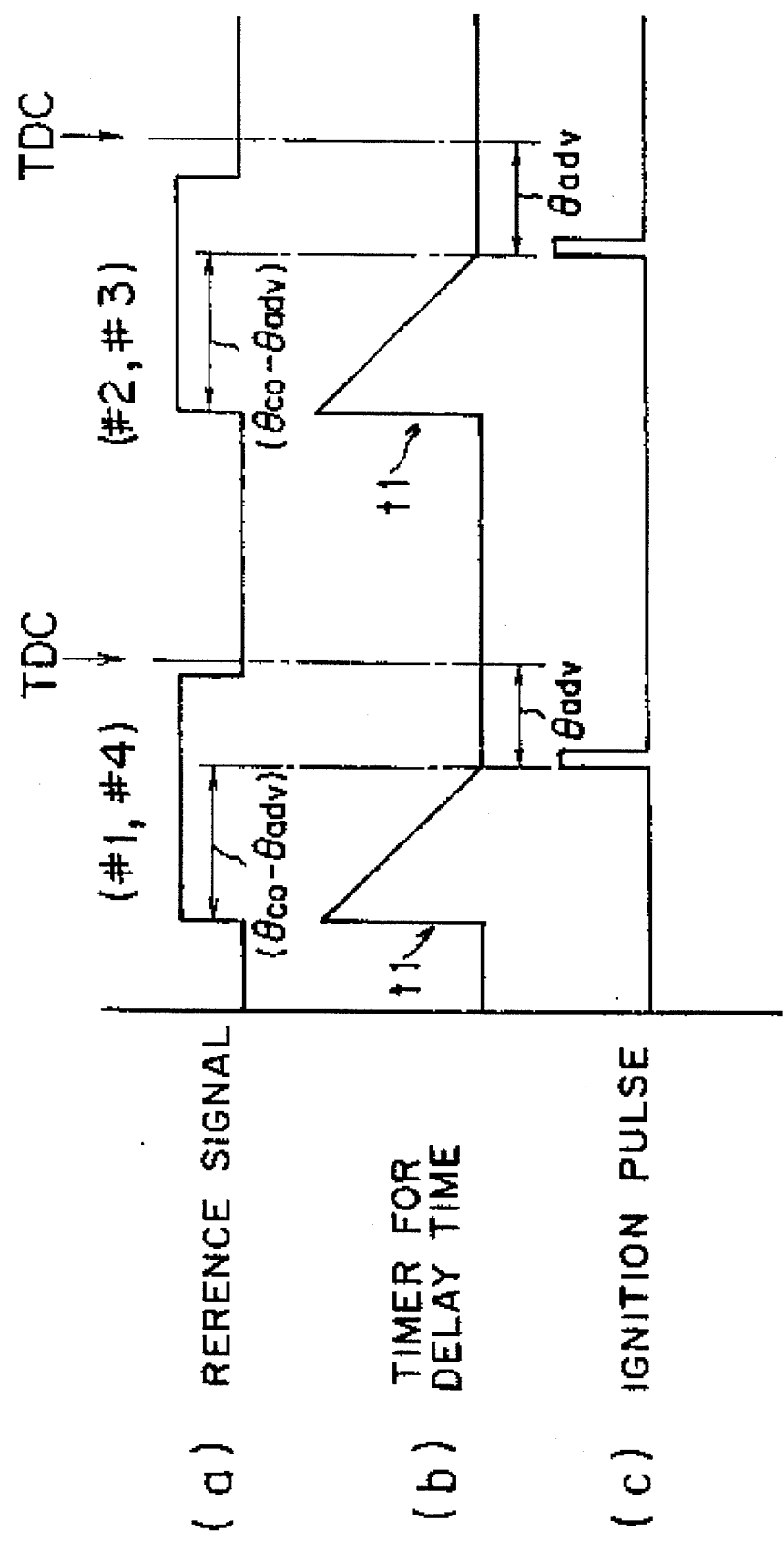
FIG. 3 [(a) to (c)] is a diagram showing, along the passage of time, operation of the ignition drive circuit in the control system of FIG. 1.

The timing control circuits 36 are arranged for the group of the selectively inactivated cylinders #1,#4 and the group of the normally operative cylinders #2,#3, respectively, and are both driven by a reference signal ($\theta$co in crank angle) from a crank angle sensor 34 and crank angle signals [pulses of the unit of 1° or 2° ($\Delta\theta$c)] from a unit crank angle sensor 33. Only the timing control circuit for the group of the selectively inactivated cylinders #1,#4 is shown in FIG. 2 and that for the group of the normally operative cylinders #2,#3 is omitted there. Here, the reference signal $\theta$co is outputted to a one-shot circuit 362, and is constructed in such a way that at the time of normal operation, the one-shot circuit 362 is triggered by the reference signal (on-off) at $\theta$co (for example 75°) before the top dead center and outputs an ignition timing signal (deenergization signal) after counting the crank angle signals (pulses of the unit of 1° or 2°) as many as determined beforehand (delay time t1 equivalent to the ignition timing, $\theta$co - $\theta$adv) [see FIGS.3(a)–(c)]. In this case, the target ignition timing $\theta$adv has been obtained in step p12 of the flow chart of FIG. 8, which will be described subsequently herein.

Figure 6:
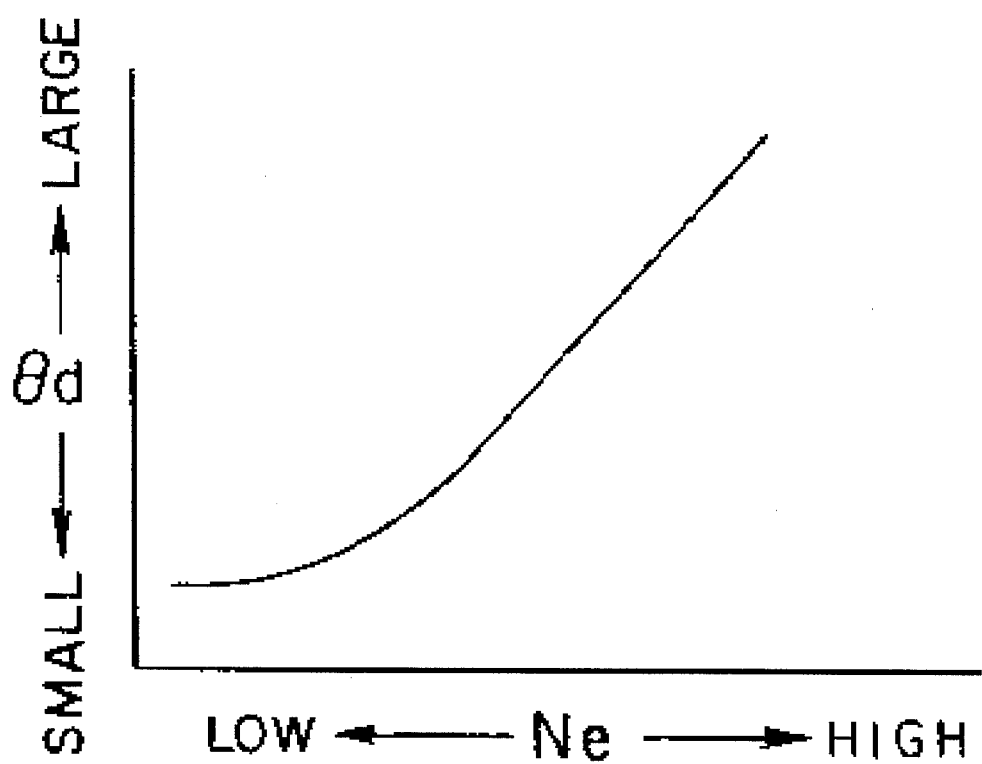
FIG. 6 is a characteristic diagram of a dwell angle calculation map which is used by the control system of FIG. 1.

A one-shot circuit 361 is constructed in such a way that it is triggered by the deenergization signal and after counting crank angle signals—each of which is equivalent to the dwell angle $\theta$d (which is obtained in accordance with the dwell angle map in FIG. 6)—as many as determined beforehand, outputs an energization start signal.

A flip-flop 363 is set by the energization start signal from the one-shot circuit 361 and is reset by the deenergization signal from the one-shot circuit 362. When the flip-flop 363 is set, the open/close drive circuit 251 causes the power transistor 38 to turn on so that a current is caused to flow to the ignition coil 37. When the power transistor 38 is turned off, the ignition coil 37 induces a high-voltage current on the secondary side and this current is transmitted to the spark plugs 23 for the selectively inactivated cylinders #1,#4 to perform ignition in the group of the selectively inactivated cylinders.

The timing control circuit (not shown) for the normally operative cylinders #2,#3 is constructed similarly. Responsive to drive of the open/close drive circuit 241 and the power transistor 38, a high-voltage current on a secondary side of the ignition coil 37 is supplied at the target ignition timing θadv to the spark plugs 23 for the normally operative cylinders #2,#3 so that ignition is performed in the group of the normally operative cylinders.

Incidentally, the ignition timing for the group of the selectively inactivated cylinders #1,#4 and the ignition in the group of the normally operative cylinders #2,#3 are alternately performed at an interval of approximately 180° in crank angle.

An essential part of the engine control unit (ECU) 15 is constructed of a microcomputer and in accordance with operational information of the engine E, executes the main routine to be described subsequently and also performs known controls such as a known fuel injection quantity control and various controls in the ignition timing calculation routine and the ignition control routine.

The ECU 15 detects a coolant temperature Tw, a throttle position θs, an intake air temperature Ta, a battery voltage VB and a knock signal Kn by a coolant temperature sensor 11, a throttle position sensor 8, an intake air temperature sensor 14, a battery sensor 20 and a knock sensor 21, and stores them in predetermined data storage areas, respectively.

Further, the ECU 15 calculates an engine speed difference ΔNe which is the difference between an actual engine speed Nen and a smoothed engine speed Neln obtained by smoothing engine speeds and at the time of idling of the engine, fetches thereinto the operation mode signals (M-1,M-2,M-3), sets an ignition timing correction amount Δθ, which corresponds to the engine speed difference ΔNe, greater at the time of the part cylinder mode than at the time of full cylinder mode, sets an advance-side ignition timing correction amount greater in absolute value than a retard-side ignition timing correction amount at the time of the part cylinder mode, calculate a basic ignition timing θb corresponding to an intake pipe negative pressure Pb and an engine speed Ne, signals indicative of the load of the engine, corrects the basic ignition timing θb by the ignition timing correction amount Δθ corresponding to the relevant operation mode to calculate a target ignition timing θadv, and then drives at the target ignition timing θadv the spark plugs 23 and the ignition drive circuits (the timing control circuits 36 and the respective igniters 24,25) as ignition drive means for the individual cylinders of the internal combustion engine.

Figure 10:
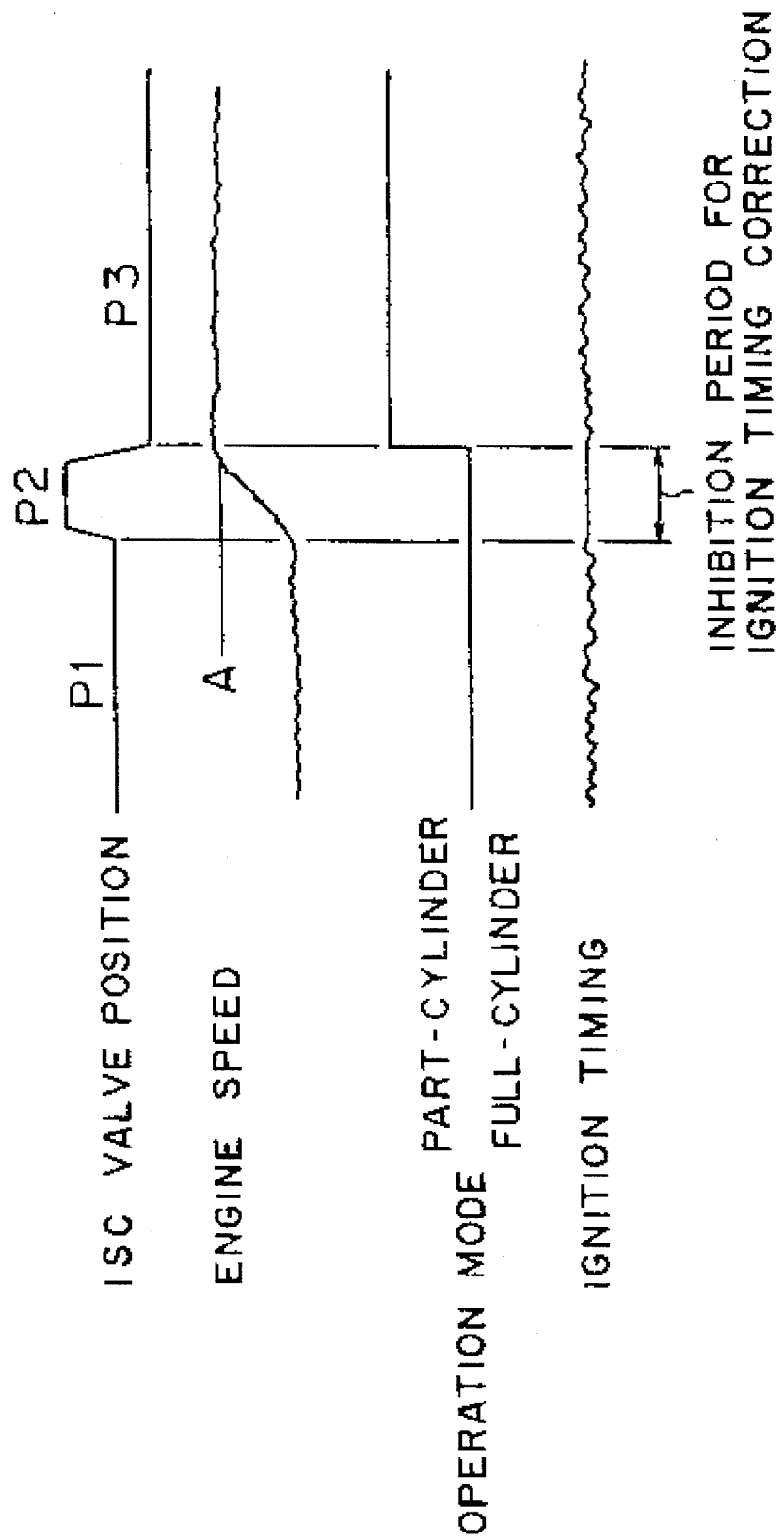
FIG. 10 is a diagram showing a relation among full cylinder/part cylinder state, variations in boost pressure and ignition timing adjustment.

When conditions are met for switching from full cylinder operation to part cylinder operation in the course of idling, the ECU 15, as shown in FIG. 10, increases the quantity of air in the idle speed control system and inhibits any correction of the ignition timing, i.e., any retard in this case on the basis of on this increase in the quantity of air. This control is performed to prevent the output from dropping in the combustion and expansion stroke due to the retard of the ignition timing and also to facilitate an increase in the engine speed.

The inhibition period for ignition timing correction is set to last until an increase in the quantity of air in the idle speed control system is completed, in other words, until an idle speed is obtained at the time of part cylinder operation.

The ECU 15 therefore has functions of basic ignition timing calculation means 151, engine speed difference calculation means 152, ignition timing correction amount calculation means 153, ignition timing correction control means 154, ignition timing calculation means 155 and ignition control means 156.

The basic ignition timing calculation means 151 calculates basic ignition timing θb on the basis of an engine load and an engine speed. The engine speed difference calculation means 152 calculates the difference ΔNe between an engine speed Nen and a smoothed engine speed Neln obtained by smoothing engine speeds. The ignition timing correction amount calculation means 153 calculates an ignition timing correction amount Δθ corresponding to the difference ΔNe at least at the time of idling.

Further, the ignition timing correction control means 154 controls the manner of operation of the ignition timing correction amount calculation means 153 upon at least one of switching between full cylinder operation and part cylinder operation and the part cylinder operation. The ignition timing calculation means 155 calculates target ignition timing θadv on the basis of the basic ignition timing θb and the ignition timing correction amount Δθ. The ignition control means 156 drives the ignition drive means ij of the respective cylinders of the engine at the target ignition timing θadv.

Describing especially the ignition timing correction control means 154 in further detail, the ignition timing correction control means 154 is constructed as follows:

(1) It is constructed to operate at the time of part cylinder operation in a manner different from the manner of operation at the time of full cylinder operation.

(2) It is constructed to control the manner of operation of the ignition timing correction amount calculation means 153 so that the ignition timing correction amount is set greater at the time of the part cylinder operation than at the time of the full cylinder operation.

(3) It is constructed to control the manner of operation of the ignition timing correction amount calculation means 153 so that the ignition timing correction amount is set greater at the time of the part cylinder operation than at the time of the full cylinder operation and at the time of the part cylinder operation, an advance-side ignition timing correction amount is set greater in absolute value than a retard-side ignition timing correction amount.

(4) It is constructed to make operation of the ignition timing correction amount calculation means 153 substantially ineffective upon switching between the full cylinder operation and the part cylinder operation.

(5) It is constructed to make operation of the ignition timing correction amount calculation means 153 substantially ineffective upon switching from the full cylinder operation to the part cylinder operation where it has been set to make the idle speed higher at the time of the part cylinder operation than at the time of the full cylinder operation.

(6) It is constructed to control the manner of operation of the ignition timing correction amount calculation means 153 so that the operation of the ignition timing correction amount calculation means 153 is made substantially ineffective upon switching between the full cylinder operation and the part cylinder operation and the ignition timing correction amount is set greater at the time-of the part cylinder operation than at the time of the full cylinder operation.

(7) It is constructed to control the manner of operation of the ignition timing correction amount calculation means 153 so that the ignition timing correction amount at the time of the part cylinder operation is set greater in absolute value on an advance side than on a retard side.

Operation of the one embodiment of the present invention will next be described in accordance with the control programs (flow charts) of FIG. 7 to FIG. 9.

Figure 7:
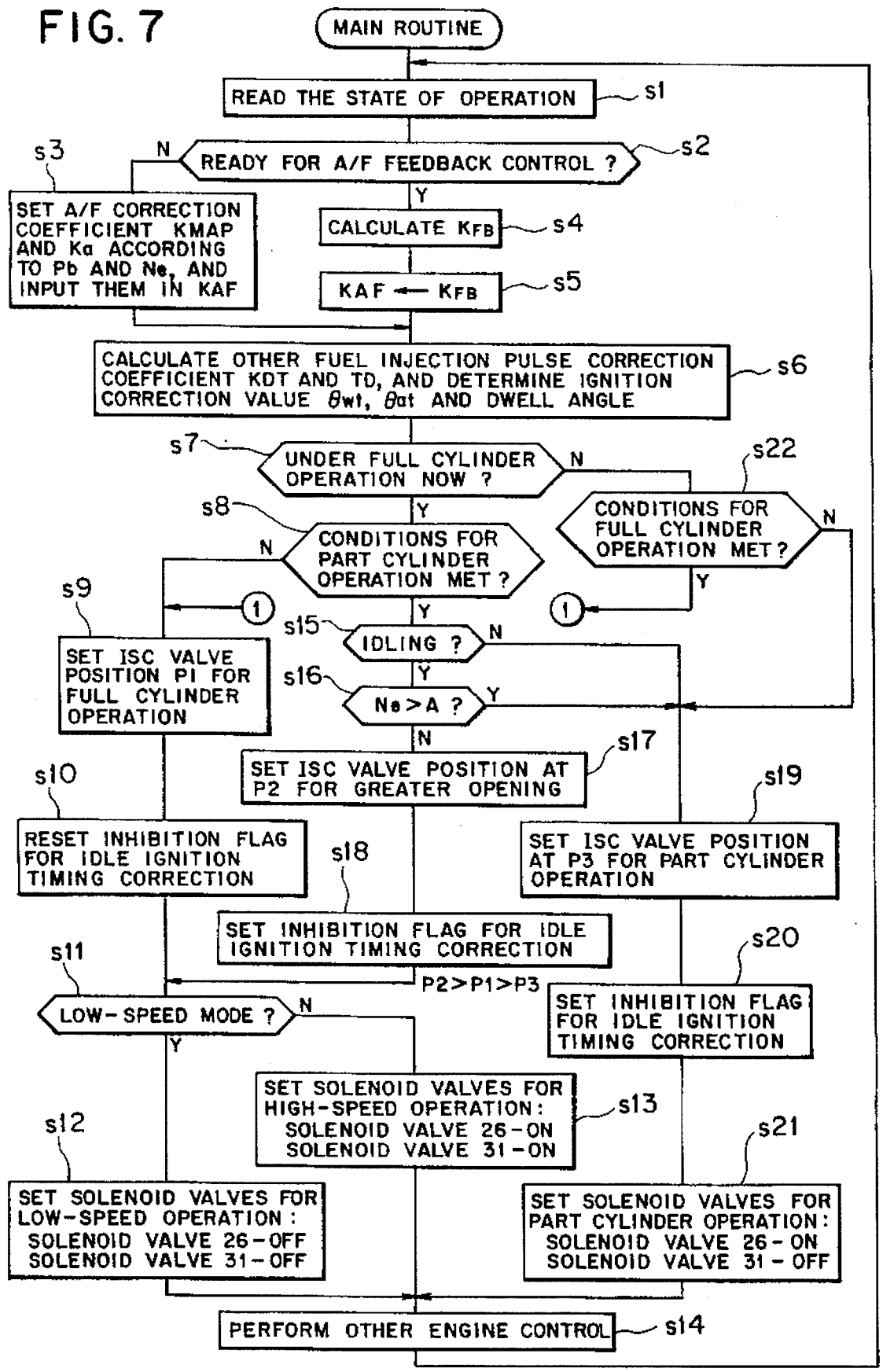
FIG. 7 is a flow chart of a main routine to be executed by the control system of FIG. 1.

When a key of an unillustrated main switch is turned on, the ECU 15 begins to perform control according to the main routine Shown in FIG. 7.

First, initial setting of functions such as checking of individual functions and setting of initial values is conducted here, followed by the reading of various operational information of the engine (step s1). The routine then advances to step s2. Specifically, it is determined whether air/fuel ratio feedback conditions are met or not. At the time of a transitional operation zone such as a power operation zone or at a time point before completion of warm-up, are calculated in step s3 an air/fuel ratio correction coefficient KMAP corresponding to current operational information (Pb,Ne) and in accordance with a suitable warm-up increase correction coefficient calculation map, a warm-up increase correction coefficient Ka corresponding to a coolant temperature Tw. These values are stored in a storage area of an address KAF, and the routine then advances to step s6.

When the air/fuel ratio feedback conditions are found to be met in step s2, a target air/fuel ratio corresponding to the current operational information (Pb,Ne) is calculated. In step s4, a fuel quantity correction coefficient $K_{FB}$ capable of achieving the air/fuel ratio is calculated. In step s5, the fuel quantity correction coefficient $K_{FB}$ is stored in another storage area of the address KAF and the routine then advances to step s6.

Here, other parameters such as a fuel injection pulse width correction coefficient KDT and a correction value TD for the dead time of fuel injection valves are set in accordance with operational conditions and further, individual correction coefficients to be used for the calculation of the target ignition timing θadv are calculated. Calculated here as correction values include a coolant temperature correction value θwt for advancing the ignition timing as the coolant temperature drops, an acceleration retard −θacc corresponding to a differential Δθs obtained by differentiating a throttle valve position θs, an intake air temperature correction value θat for advancing the ignition timing as the temperature of intake air drops, and a knock retard value −θk required as the knock signal Kn increases. Also calculated is a battery correction value tb for increasing the energized time as the battery voltage VB drops. A dwell angle θd corresponding to an ignition energizing time is also calculated in accordance with the dwell angle calculation map of FIG. 6 so that the dwell angle increases with the engine speed Ne.

In the step s7, it is next determined whether the engine is currently in the full cylinder operation or not. This determination is made, for example, by checking the current operation mode on the basis of whether the low and high solenoid valves 26,31 are on or off.

Figure 5:
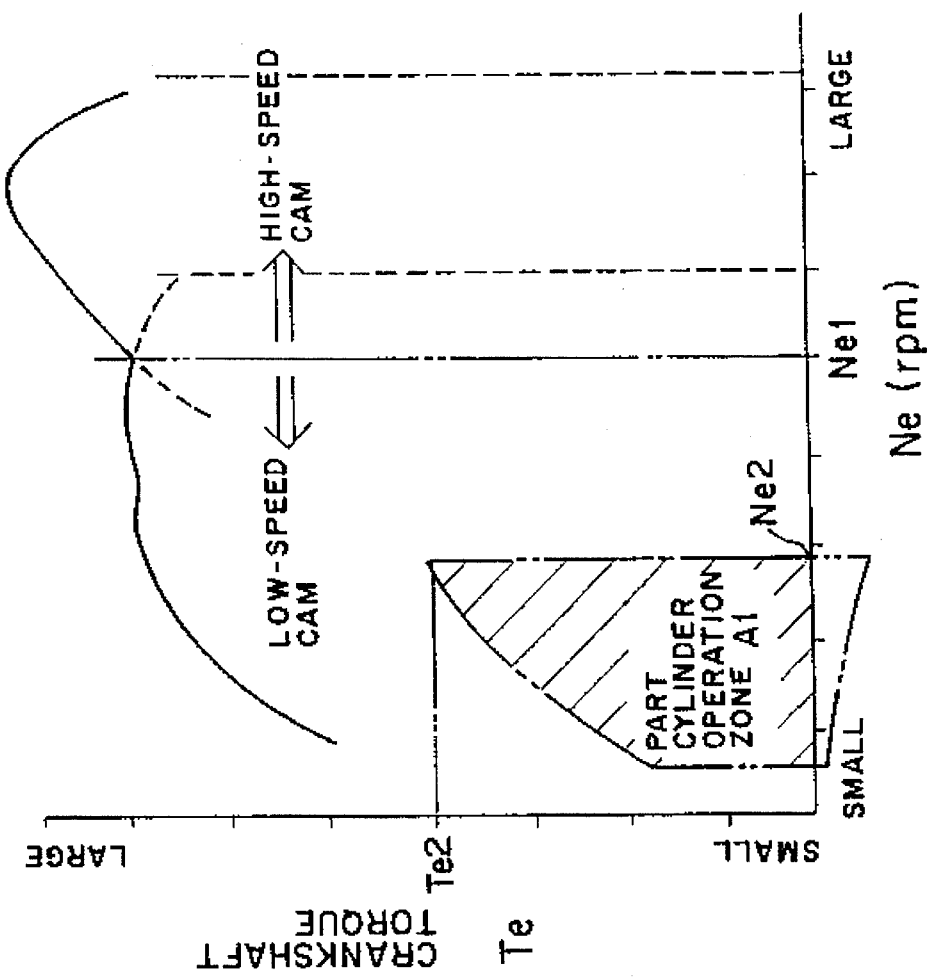
FIG. 5 is a characteristic diagram of an operation zone calculation map for the internal combustion engine on which the control system of FIG. 1 is mounted.

When the engine is in the full cylinder operation, it is then determined in step s8 whether conditions for part cylinder operation have been met or not. This determination is made by checking from operational information of the engine, especially the engine speed Ne and the crankshaft torque (which has been calculated from Pb and Ne in accordance with a different routine) Te, specifically based on threshold values Ne2 and Te2 whether the operation is in such a part cylinder operation zone A1 as shown in FIG. 5.

When the conditions for part cylinder operation have not been met, processing is applied to continue the full cylinder operation. Namely, an ISC valve position P1 for the full cylinder operation is set in step s9. In step s10, an idle ignition timing correction inhibition flag is set. It is then determined in step s11 whether the operation mode is the low-speed mode M-1 or not. When the engine speed Ne is found to be lower than Ne1 (see FIG. 5) in step s11, the operation mode is determined to be the low-speed mode M-1. Otherwise, the operation mode is determined not to be the low-speed mode, that is, to be the high-speed mode M-2.

When the operation mode is found to be the low-speed mode M-1, both the solenoid valves 26,31 are turned off in step s12 so that all the cylinders are driven in the low-speed mode. When the operation mode is found to be the high-speed mode M-2, on the other hand, both the solenoid valves 26,31 are turned on in step 13 so that all the cylinders are driven in the high-speed mode.

Other controls in the main routine, such as fuel supply control, are thereafter performed in step s14, and the routine then returns.

Here, the fuel supply control which is performed in the course of the main routine can be effected, for example, by the known injector drive control that a basic fuel pulse width is calculated on the basis of the quantity of intake air, the basic fuel pulse is multiplied by an air/fuel ratio and other correction coefficients to determine an injector drive time, and only the injectors 17 for the normally operative cylinders #2,#3 other than the selectively inactivated cylinders #1,#4 is driven at the time of part cylinder operation (upon receipt of an injector stop command) or the injectors 17 for all the cylinders are driven at the time of full cylinder operation.

When conditions for the part cylinder operation are found to be met in step s8, it is next determined in step s15 whether the engine is idling or not. If so, it is then determined in step s16 whether or not the engine speed Ne is higher than an engine speed A for determining switching to the part cylinder operation (this engine speed A for determining switching to the part cylinder operation has been set at a value slightly lower than the target engine speed for the part cylinder operation). When the engine speed Ne is equal to or lower than the engine speed A for determining switching to the part cylinder operation, it is necessary to apply transition processing for switching from the full cylinder operation to the part cylinder operation. The following processing is hence applied.

In step s17, a valve position P2 is set to increase the opening of the ISC valve and in step s18, an idle ignition timing correction inhibition flag is set. As a consequence, a command is outputted to the idle speed control system to increase the opening of the ISC valve 4 so that the quantity of air is increased. Concurrently with this increase of the opening of the ISC valve 4, an ignition timing correction inhibition command is also outputted to a distributor. With a view to providing both a measure to counter vibrations at the time of part cylinder idling and a measure to improve the gas mileage at the time of full cylinder idling, a target engine speed for the part cylinder idling is set higher than that for the full cylinder idling in this embodiment. Further, the valve position P2 for the greater ISC opening is set so that at the time of switching from the full cylinder operation to the part cylinder operation, the idle speed promptly approaches toward the target engine speed for the part cylinder operation.

When the operation mode is found to be the low-speed mode M-1, the processings of steps s12 and s14 are then conducted. When the operation mode is found to be the high-speed mode M-2, the processings of steps s13 and s14 are then carried out.

Consequently, at the transition time of the switching from the full cylinder operation to the part cylinder operation, a combustion and expansion stroke is performed with an increased quantity of air at ignition timing similar to that for normal operation in each cylinder in which the combustion and expansion stroke is performed, resulting in a prompt increase in the output and also in a prompt increase in the engine speed.

When the engine speed Ne, as a result, becomes higher than the engine speed A for determining switching to the part cylinder operation, the YES route is chosen in step s16, an ISC valve position P3 is set for the part cylinder operation in step s19, an idle ignition timing correction inhibition flag is reset in step s20, and only the first solenoid valve 26 is turned on in step s21 so that the first and fourth cylinders #1,#4 are switched to the selectively inactivated mode. As a result, the operation is changed to the part cylinder operation. At this time, the inhibition of correction of the idle ignition timing is also released. Incidentally, the relationship in magnitude among the above valve positions P1, P2 and P3 is P2>P1>P3.

Subsequently, while the part cylinder operation is continued, the NO routes are chosen in step s7 and s22, followed by the processings of steps s19–s21 and s14, respectively.

When the conditions for the full cylinder operation are then met in the course of this part cylinder operation, processings for the full cylinder operation are applied. After taking the YES route in step s22, the ISC valve position P1 is set for the full cylinder operation in step s9. In step s10, the idle ignition timing correction inhibition flag is reset, the solenoid valves are set according to the low-speed mode or high-speed mode, the other controls in the main routine, such as fuel supply control processing, are performed, and the main routine then returns (steps s11–s14).

Figure 8:
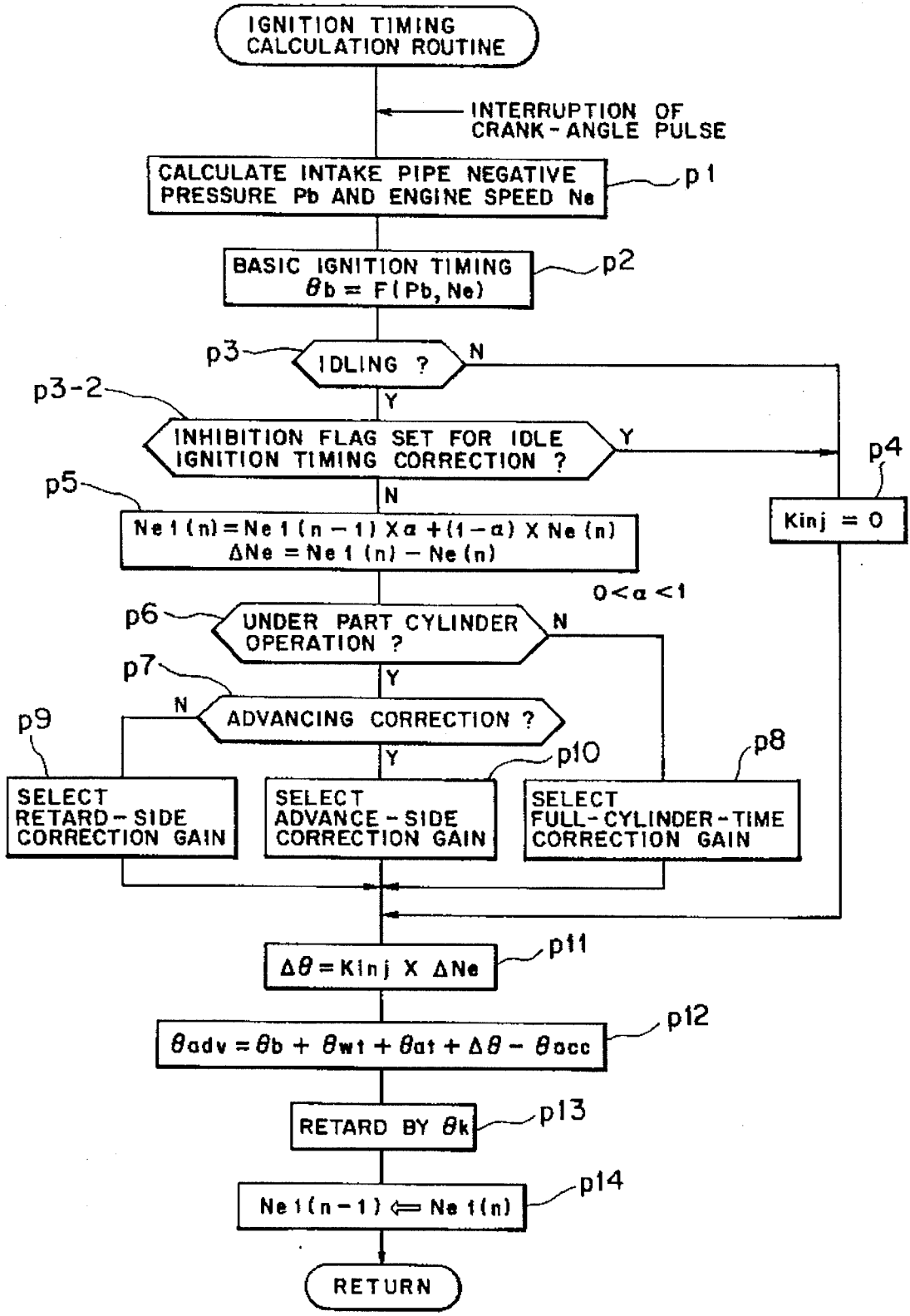
FIG. 8 is a flow chart of an ignition timing calculation routine to be executed by the control system of FIG. 1.
Figure 9:
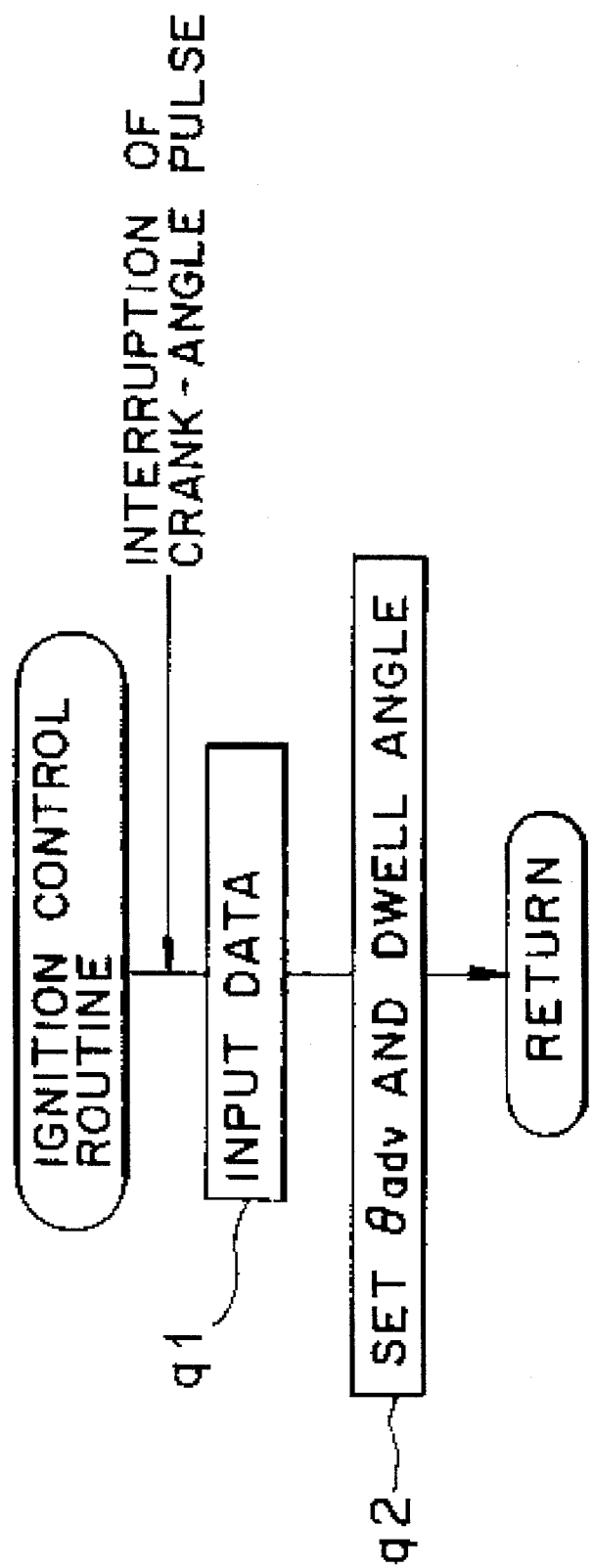
FIG. 9 is a flow chart of an ignition control routine to be executed by the control system of FIG. 1.

In the course of such performance of the main routine, the ignition timing calculation routine of FIG. 8 and the ignition control of FIG. 9 are performed.

Namely, the ignition timing calculation routine of FIG. 8 is performed based on a change of the reference signal θco from OFF to ON, which takes place whenever each cylinder reaches 75° before the top dead center (75° BTDC) (crank angle: 180°). Here, an intake pipe negative pressure Pb and an engine speed Ne are calculated based on detection signals of the negative pressure sensor 10 and the engine speed sensor 12 in step p1. In step p2, basic ignition timing θb corresponding to the current intake pipe negative pressure Pb and engine speed Ne is then calculated in accordance with a basic ignition timing calculation map which has been set in advance.

The routine then advances to step p3, in which it is determined whether the engine speed Nen is lower than an idle determination value Ne, a preset value, or not. If higher, the routine then reaches step p4 in which the correction gain Kinj for non-idle time is set at a preset value (for example, zero in this embodiment), and the routine then advances to step p11.

Where the operation is found to be under idling in step p3, on the other hand, it is then determined in step p3-2 whether the idle ignition timing correction inhibition flag has been set or not. If the engine is found to be at the transition time of switching from the full cylinder operation to the part cylinder operation, the processing of step p4 is still performed because the idle ignition timing correction inhibition flag has been set. As a result, the correction of the idle ignition timing is inhibited at the above transition time of switching.

Figure 4:
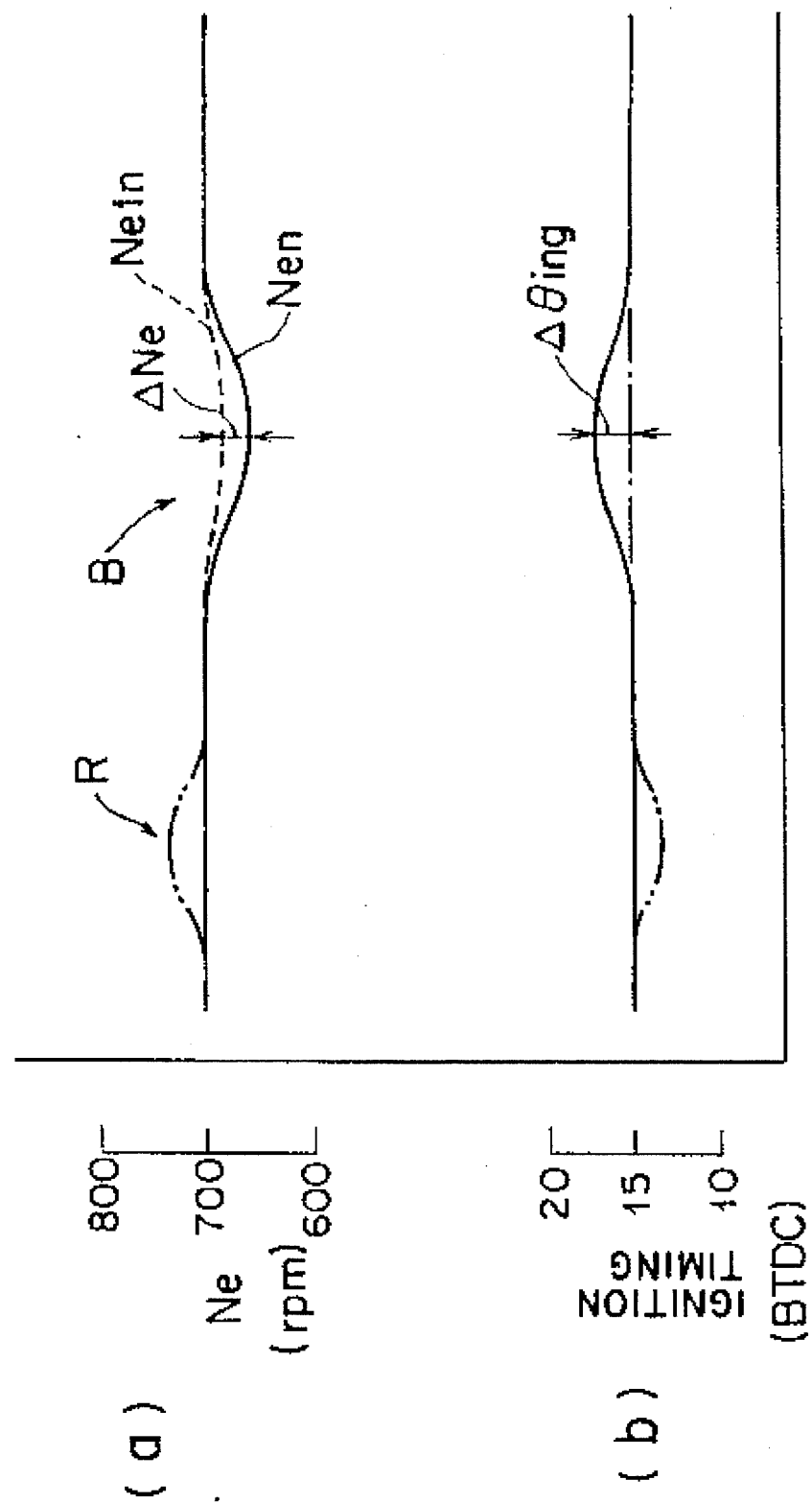
FIG. 4 [(a) and (b)] is a diagram showing, along the passage of time, variations in idle speed to be corrected by the control system of FIG. 1 and changes in the correction amount of ignition timing upon correction by the control system.

Upon completion of the transitional processing for the switching, the NO route is chosen in step p3-2 and the processing of step p5 is applied. Described specifically, when the routine reaches step p5, the current engine speed Nen is fetched at a predetermined fetching rate α into the Smoothed engine speed Neln(n-1) up to the last detection of the engine speed so that the current smoothed engine speed Neln is newly calculated. Calculated next in accordance with the formula (2) is the engine speed difference ΔNe between the smoothed engine speed Neln and the current engine speed Nen ]see FIGS. 4(a) and 4(b)].

$$Neln=Nel(n-1)\times\alpha+(1-\alpha)\times Nen \qquad (1)$$

$$\Delta Ne=Neln-Nen \qquad (2)$$

The routine then advances to step p6, in which it is determined whether the operation is in the part cylinder mode M-3 or not. When the operation is not found to be in the part cylinder mode, that is, is found to be in the low-speed or high-speed mode (M-1 or M-2), the routine advances to step p8 in which a full cylinder time correction gain Kinja (a preset value) is chosen, and the routine then advances to step p11.

If the operation is found to be in the part cylinder mode in step p6, on the other hand, the routine then advances to step p7. Here, it is determined whether the current engine speed difference ΔNe is positive or negative. If the engine speed difference ΔNe is found to be positive, the engine speed is considered to have dropped (i.e., in a zone B indicated by a solid curve in FIG. 4) and the routine then advances to step p10 to choose an advance-side correction gain Kinjb. If the engine speed difference ΔNe is negative, the engine speed is considered to have increased (i.e., in a zone R indicated by a two-dot chain curve in FIG. 4) and the routine then advances to step p9 to choose a retard-side correction gain Kinjr. Whichever gain is chosen, the routine then advances to step p11.

Figure 11:
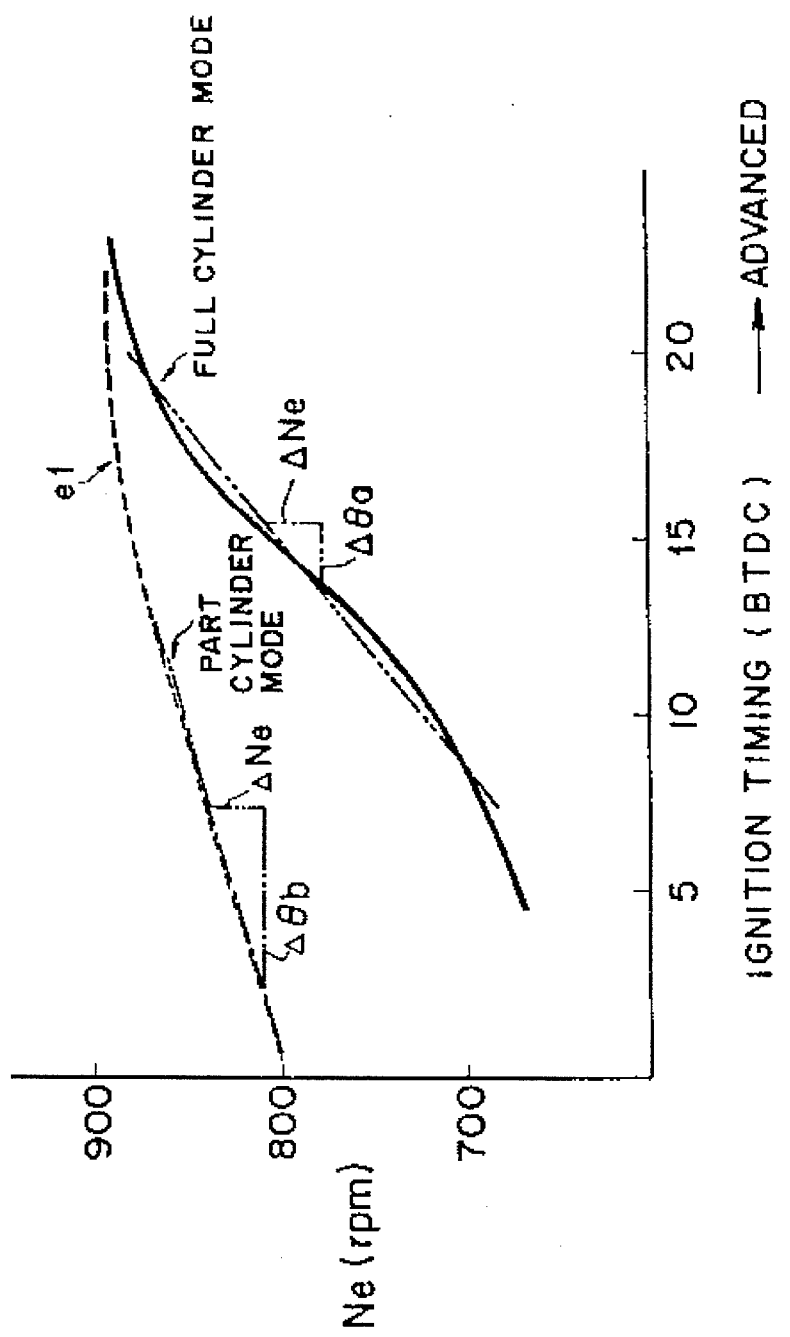
FIG. 11 is a characteristic diagram of ignition timing vs. engine speed during idling of an engine.

Incidentally, the full cylinder time correction gain Kinja as well as the advance-side correction gain Kinjb and the retard-side correction gain Kinjr are set in accordance with the corresponding operational data of the engine. For example, they can be adequately set based on the ignition timing-engine speed characteristic diagram for idling time, shown in FIG. 11. Especially in this embodiment, the absolute values of the part cylinder time advance-side correction gain Kinjb (=Δθb/ΔNe) and retard-side correction gain Kinjr are set sufficiently greater than the full cylinder time correction gain Kinja (=Δθa/ΔNe). Further, the advance-side correction gain Kinjb (=Δθb/ΔNe) is set greater in absolute value than the retard-side correction gain Kinjr at the time of part cylinder operation.

Upon correction of any deviation in the engine speed at the time of idling, the degree of correction to the ignition timing to eliminate the deviation in the engine speed is therefore made greater at the time of the part cylinder operation compared with the full cylinder operation, whereby the ignition timing is corrected to the advance side or the retard side. This has made it possible to avoid a reduction in the responsibility to correction to the idle speed at the time of the part cylinder operation and also to correct with good responsibility any deviation in the idle speed at the time of the part cylinder operation. In particular, the degree of an advance-side correction is set greater than that of a retard-side correction at the time of the part cylinder operation so that upon a drop in the idle speed, the idle speed is increased with good responsibility to avoid an engine failure.

In step p11, the correction gains Kinja,Kinjb, Kinjr chosen this time as the current correction gain Kinj are fetched in, and this Kinj is multiplied by the engine speed difference ΔNe to calculate the ignition timing correction amount Δθ. The routine then advances to step p12.

In step p12, the basic ignition timing θb, the coolant temperature correction value θwt, the acceleration retard −θacc, the intake air temperature correction value θat for advancing the ignition timing as the temperature of intake air drops, the ignition timing correction amount Δθ are fetched in, and calculation of the target ignition timing θadv is performed in accordance with the following formula (3):

$$\theta adv = \theta b + \theta wt + \theta at + Kinj \times \Delta Ne - \theta acc \quad (3)$$

In step p13, the target ignition timing θadv is then retarded by a knock regard value −θk in response to an increase in the knock signal Kn. In step p14, the storage area of the last smoothed engine speed Nel(n-1) is updated by the current smoothed engine speed Neln, and the main routine returns. Incidentally, a knock retard map is set in advance.

The ignition control routine of FIG. 9 is performed by generating an interrupt in the main routine on the basis of a change of the reference signal θco from OFF to ON, which takes place whenever each cylinder reaches 75° before the top dead center (75° BTC) (crank angle: 180°) in the course of the main routine. In step q1 of the ignition control routine, predetermined data are fetched in. In step q2, the latest target ignition timing θadv and the latest dwell angle θd are set in each timing control circuit 36, and the routine returns to the main routine.

Here, the ignition of the group of the normally operative cylinders #2,#3 and the ignition of the group of the selectively inactivated cylinders #1,#4 are effected by driving the igniters 24 and 25, respectively. Upon drive of the individual igniters at every crank angle of 180°, the cylinders in one of the groups and the cylinders in the other group are alternately ignited near the top dead center of compression and near the top dead center of exhaust, respectively.

Upon correction of any deviation in idle speed during idling, it is therefore possible to set the absolute value of the ignition timing correction amount per unit engine speed deviation greater in the part cylinder mode than in the full cylinder mode. As a result, it is possible to compensate the low responsibility at the time of correction of a deviation in the idle speed due to an insufficient ignition timing correction amount at the time of the part cylinder operation. In particular, the degree of the advance-angle correction at the time of the part cylinder operation is set greater than the degree of the corresponding retard-angle correction so that upon a drop in the idle speed, the idle speed can be increased with good responsibility to avoid an engine failure. In this respect too, the idle speed can be stabilized with good responsibility.

Upon switching from the full cylinder operation to the part cylinder operation in the course of idling, the switching to the part cylinder operation is performed after the quantity of intake air is increased to raise the engine speed and this increase in the engine speed is also promoted by inhibiting correction of the ignition timing which is conducted to reduce a torque shock due to the increase in the engine speed. This has made it possible to prevent a sudden drop in the idle speed when the operation is changed to the part cylinder operation.

INDUSTRIAL UTILITY

As has been described above, this invention can promptly stabilize revolutions of an engine after switching between full cylinder operation and part cylinder operation by controlling the manner of operation, which is performed to calculate an ignition timing correction amount, upon at least one of changing between the full cylinder operation and the part cylinder operation and the part cylinder operation and can also stabilize an idle speed with good responsibility by correcting the ignition timing. This invention is therefore suited for use in a control system developed by paying attention especially to idling of an engine which can be mounted on an automotive vehicle and can stop the supply of fuel to some of its cylinders to perform part cylinder operation in a particular state of operation.

We claim:

1. A control system for a multi-cylinder internal combustion engine (E) in which switching between full cylinder operation with all cylinders in operation and part cylinder operation with some of the cylinders kept out of operation is performed at least in the course of idling, the internal combustion engine having an associated engine speed sensor and engine load sensor, comprising:

a microcomputer receiving an engine speed signal from the engine speed sensor and an engine load signal from the engine load sensor.

wherein said microcomputer is programmed to perform the steps of:

calculating a basic ignition timing on the basis of load on and an engine speed of said internal combustion engine (E);

calculating a difference between a smoothed engine speed, which has been obtained by smoothing engine speeds of said internal combustion engine, and the engine speed of said internal combustion engine;

calculating an ignition timing correction amount corresponding to the difference and a correction gain at least in the course of the idling;

performing ignition timing correction control by changing the correction gain to a value different from that for the full cylinder operation upon at least one of the switching between the full cylinder operation and the part cylinder operation and the part time operation;

calculating a target ignition timing on the basis of the basic ignition timing and the ignition timing correction amount; and providing an output driving signal;

wherein the control system further comprises means for driving the ignition of the respective cylinders in the internal combustion engine, wherein said output driving signal from said microcomputer is provided to said ignition driving means to drive the ignition of the respective cylinders at said target ignition timing.

2. A control system according to claim 1, wherein said microcomputer performs ignition timing correction control so as to change the correction gain so that the ignition timing correction amount is set greater at the time of the part cylinder operation than at the time of the full cylinder operation.

3. A control system according to claim 1, wherein said microcomputer performs ignition timing correction control so as to change the correction gain so that the ignition timing correction amount is set greater at the time of the part cylinder operation than at the time of the full cylinder operation and at the time of the part cylinder operation, an advance-side ignition timing correction amount is set greater in absolute value than a retard-side ignition timing correction amount.

4. A control system according to claim 1, wherein said microcomputer performs ignition timing correction control so as to make substantially ineffective the calculation of the ignition timing correction amount upon switching between the full cylinder operation and the part cylinder operation.

5. A control system according to claim 4, wherein an idle speed is set faster in the full cylinder operation than in the part cylinder operation, and said microcomputer performs ignition timing correction control so as to make substantially ineffective the calculation of the ignition timer correction amount calculation upon switching from the full cylinder operation to the part cylinder operation.

6. A control system according to claim 5, further comprising means (4) for temporarily increasing the amount of intake air to the internal combustion engine (E) upon switching from the full cylinder operation to the part cylinder operation.

7. A control system according to claim 1, wherein said microcomputer performs ignition timing correction control so that calculation of said ignition timing correction amount is made substantially ineffective upon switching between the full cylinder operation and the part cylinder operation and the correction gain is changed to set the ignition timing correction amount greater at the time of the part cylinder operation than at the time of the full cylinder operation.

8. A control system according to claim 1, wherein said microcomputer performs ignition timing correction control so as to change the correction gain so that, at the time of the part cylinder operation, the ignition timing correction amount is set greater in absolute value on an advance side than on a retard side.

* * * * *